United States Patent [19]
Liu

[11] Patent Number: 5,596,874
[45] Date of Patent: Jan. 28, 1997

[54] APPARATUS FOR MAKING CARBON-DIOXIDE SNOW BAR

[76] Inventor: Te-San Liu, C/O Hung Hsing Patent Service Center P.O. Box 55-1670, Taipei, Taiwan

[21] Appl. No.: 644,193

[22] Filed: May 10, 1996

[51] Int. Cl.$^6$ .............................. F25C 1/00; B29C 43/00
[52] U.S. Cl. ...................... 62/1; 62/604; 62/605
[58] Field of Search .................. 62/605, 604, 1

[56] References Cited

U.S. PATENT DOCUMENTS

| | | | |
|---|---|---|---|
| 2,499,386 | 3/1950 | Joerreu | 62/604 X |
| 3,576,112 | 4/1971 | Frost et al. | 62/605 |
| 4,404,807 | 9/1983 | Zemelman et al. | 62/1 |
| 4,487,023 | 12/1984 | Hegadorn et al. | 62/1 |
| 5,426,948 | 6/1995 | Hyde, Jr. | 62/604 |
| 5,475,981 | 12/1995 | Becker | 62/605 |

FOREIGN PATENT DOCUMENTS 2146943  5/1985  United Kingdom ............ 62/605

*Primary Examiner*—Christopher Kilner

[57] ABSTRACT

An apparatus for making carbon-dioxide snow or frost bar includes a feeding means by feeding liquefied carbon dioxide and a plurality of edible fillers such as juice concentrates into an extruder for extruding the raw materials, a forming device for discharging the extruded product from the extruder to form a dry ice bar at a freezing temperature of the liquefied carbon dioxide, a packaging and storage device for packaging the carbon-dioxide snow bars for storage, sales and final uses.

10 Claims, 7 Drawing Sheets

APPARATUS FOR MAKING CARBON-DIOXIDE SNOW BAR

BACKGROUND OF THE INVENTION

Carbon dioxide liquefies under pressure and freezes at −56.6° C. to form a solid which is known as dry ice. The dry ice may be used to prepare fizzy drinks and soda syphons containing carbon dioxide.

However, how to well divide the dry ice into a plurality of small pieces, like a cube sugar used for making coffee or milk drinks, will become a problem.

If the carbon dioxide snow may be produced and packed into small packs or bags, it will serve as a convenient beverage additive or favorite taste.

The present inventor has invented an apparatus for making carbon-dioxide snow bars for a convenient packaging, storage, handling and enjoying of the bars.

SUMMARY OF THE INVENTION

The object of the present invention is to provide an apparatus for making carbon-dioxide snow or frost bar including a feeding means by feeding liquefied carbon dioxide and a plurality of edible fillers such as juice concentrates into an extruder for extruding the raw materials, a forming device for discharging the extruded product from the extruder to form a dry ice bar at a freezing temperature of the liquefied carbon dioxide, a packaging and storage device for packaging the carbon-dioxide snow bars for storage, sales and final uses.

DETAILED DESCRIPTION

Figure 1:
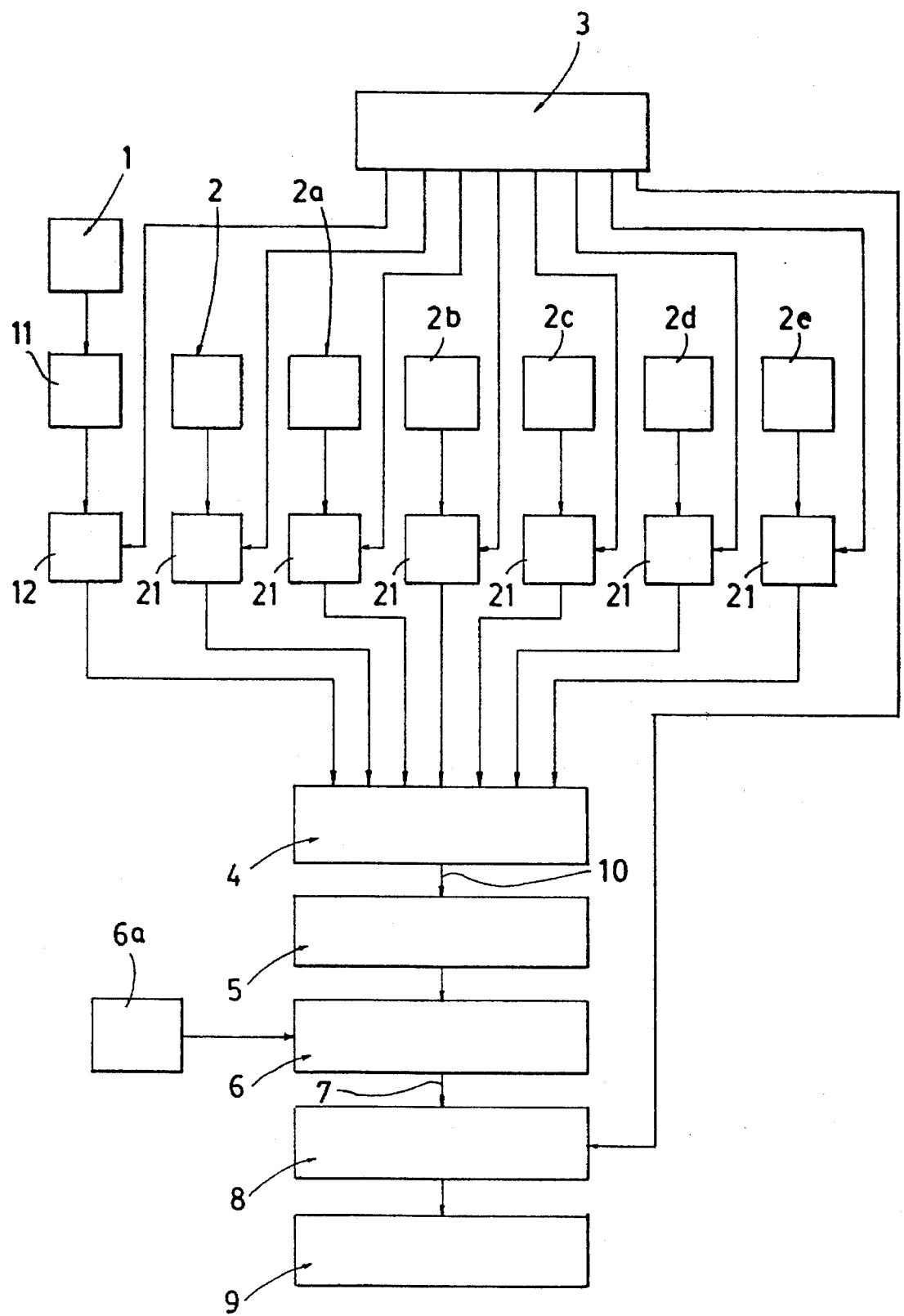
FIG. 1 is a flow sheet showing the manufacturing process of the present invention.

As shown in FIGS. 1–5, the apparatus for making carbon-dioxide snow or frost bar of the present invention comprises: a liquefied carbon dioxide source 1 compressed by high pressure equipment or stored in a high-pressure vessel a plurality of edible fillers 2, a control means 3 for manually or automatically controlling the filling, distributing sequences, and other relevant operations for making the snow bars 7, a feeding means 4 for feeding the raw materials 10 including the liquefied carbon dioxide 1 and at least an edible filler 2 into an extruding means 5, a forming means 6 disposed around and positioned under the extruding means 5 for forming carbon-dioxide snow bar 7, which may be cut into small pieces each having an equal length by a cutter (not shown) and kept at a freezing temperature as maintained by a freezing means 6a disposed at the forming means 6 for keeping a system temperature of the forming means 6 not higher than −56.6° C. for forming the snow-like or frost dry ice, a packaging means 8 for receiving and packaging the produced carbon-dioxide snow bars 7, and a freezing storage means 9 for storing the snow bars 7 or for handling or sales.

The liquefied carbon dioxide ($CO_2$) 1 is a purified and edible grade and is fed to the extruding means 5 through a feeding means 4, provided with an adjusting valve 11 which may be a pressure-regulating valve or a needle valve (not shown), and a carbon-dioxide solenoid valve 12 as controlled by the control means 3.

The control means 3 may be a manual controller, a computer controller, a sequence controller for controlling the sequence of the feeding of $CO_2$ (1) and filler 2.

The edible filler 2 may be selected from: a juice concentrate, a food or beverage additive, a coloring agent, a flavor agent and other edible matters preferably made as powder, paste or liquid, but not limited in the present invention.

The fillers 2, 2a, 2b, 2c, 2d and 2e as shown in FIG. 1 indicate that there are six fillers can be selectively added into the liquefied carbon dioxide 1 for mixing an extrusion raw material 10 fed into the extruding means 5 by the feeding means 4.

Figure 2:
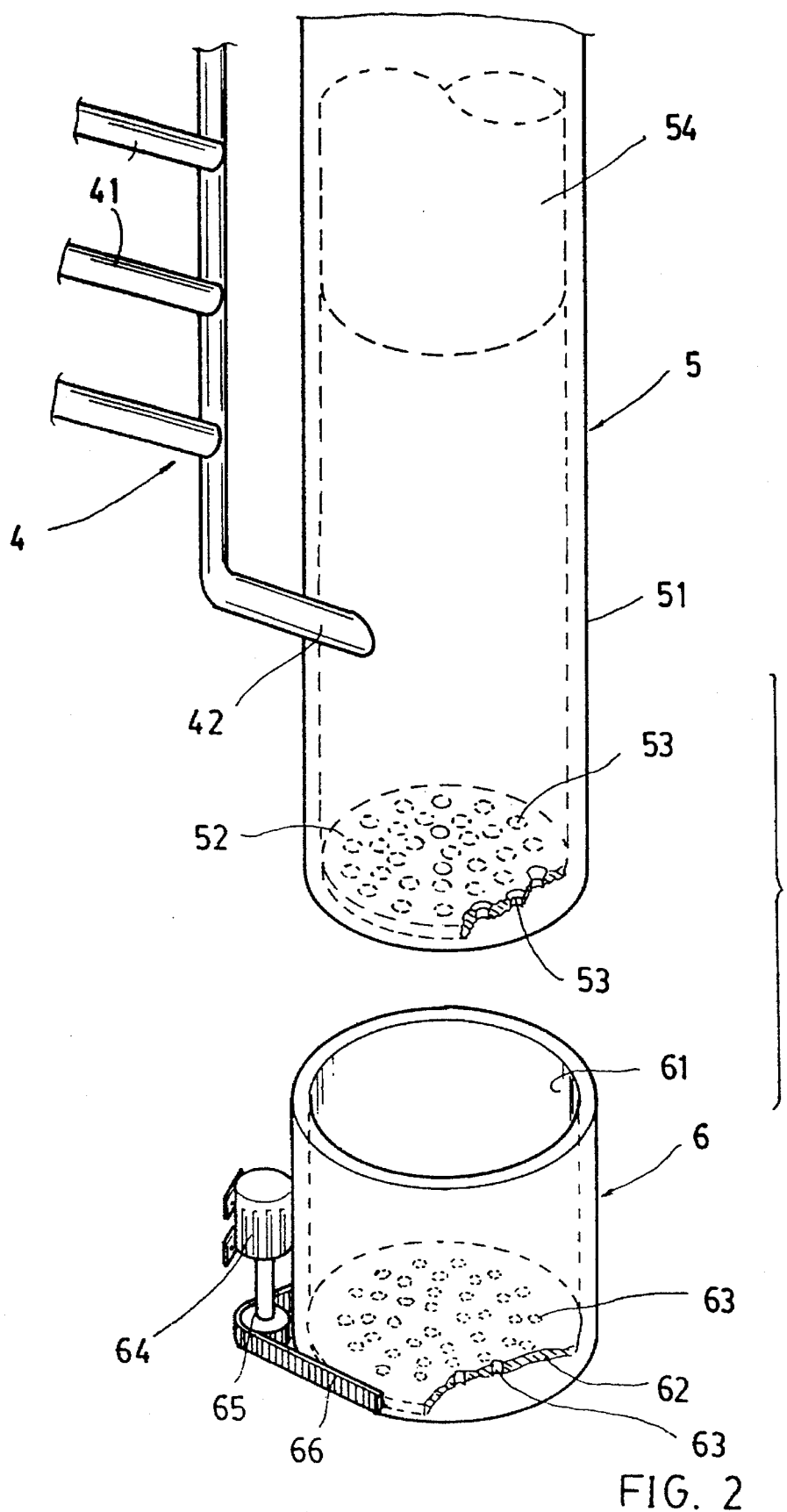
FIG. 2 is an exploded view of the major devices in accordance with the present invention.
Figure 3:
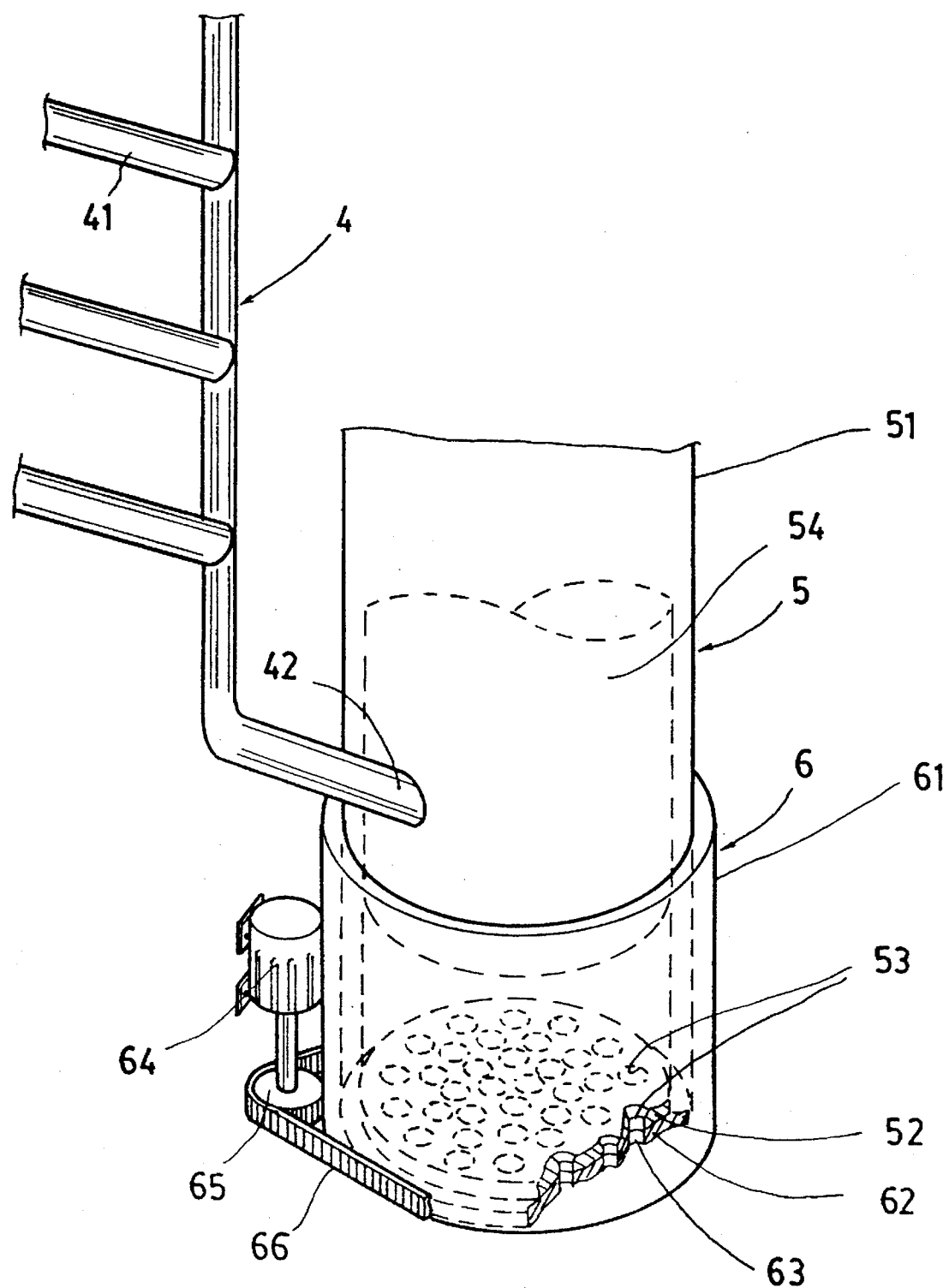
FIG. 3 is an illustration showing the assembled extruding means, the feeding means and the forming means for making $CO_2$ snow bars in accordance with the present invention.

The feeding means 4 as shown in FIG. 2 includes: a plurality of branch tubes 41 respectively communicated with the liquefied carbon dioxide 1 and the fillers 2, 2a, . . . , 2e; and a feeder pipe 42 for feeding the raw material 10 into the extruding means 5.

Each filler 2 is connected to the feeding means 4 by a filler solenoid valve 21 for controlling the flow of the filler 2 into the extruding means 5 through the feeding means 4 by the control means 3.

A computer software (not shown) may be preprogrammed for manipulating an optimum mode or sequence for sequentially or selectively opening or closing the relevant solenoid valves 12, 21 of the carbon dioxide 1 and the fillers 2, 2a, . . . , 2e.

Figure 6:
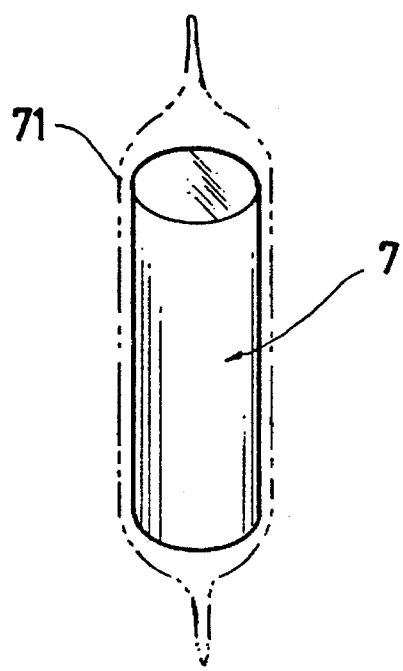
FIG. 6 shows a first $CO_2$ snow bar product of the present invention.

In this invention, a single "ingredient" may form a snow bar as shown in FIG. 6, which may be packed by a bag or sac 71.

Figure 7:
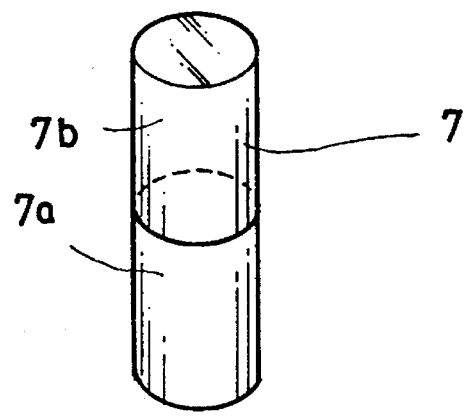
FIG. 7 shows a second snow bar product of the present invention.
Figure 8:
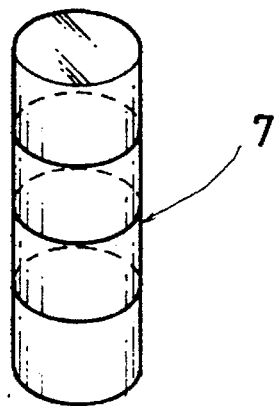
FIG. 8 shows a third snow bar product of the present invention.
Figure 9:
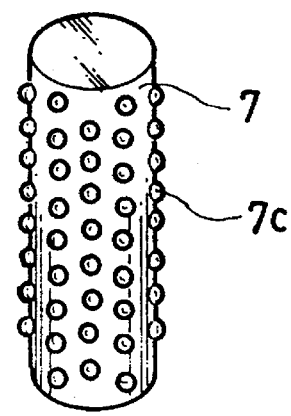
FIG. 9 shows a fourth snow bar product.

Two ingredients or two layers 7a, 7b may be added for obtaining the snow bar product 7 as shown in FIG. 7; and four layers of snow bar product 7 can be obtained as shown in FIG. 8.

By spraying colorful drops 7c of juice concentrates, for example, onto the bar 7, the snow bar 7 may thus be decorated for interesting purpose.

Since the frozen carbon dioxide snow may sublime by absorbing the ambient heat to cool down the ambient temperature, it may help reduce the refrigeration load of the freezing means 6a.

The extruding means 5 includes: a cylinder 51 communicated with the feeding means 4, a plunger 54 reciprocatively held in the cylinder 51 for squeezing the raw material 10 of the liquefied carbon dioxide 1 and the edible filler 2 as fed by the feeding means 4, and a cylinder bottom plate 52 drilled with a plurality of injection holes 53 through the cylinder bottom plate 52 for outwardly or downwardly injecting the raw material 10.

Each injection hole 53 may be formed as a cone shape tapered downwardly for an easy injection of the raw material into the forming means 6.

Figure 4:
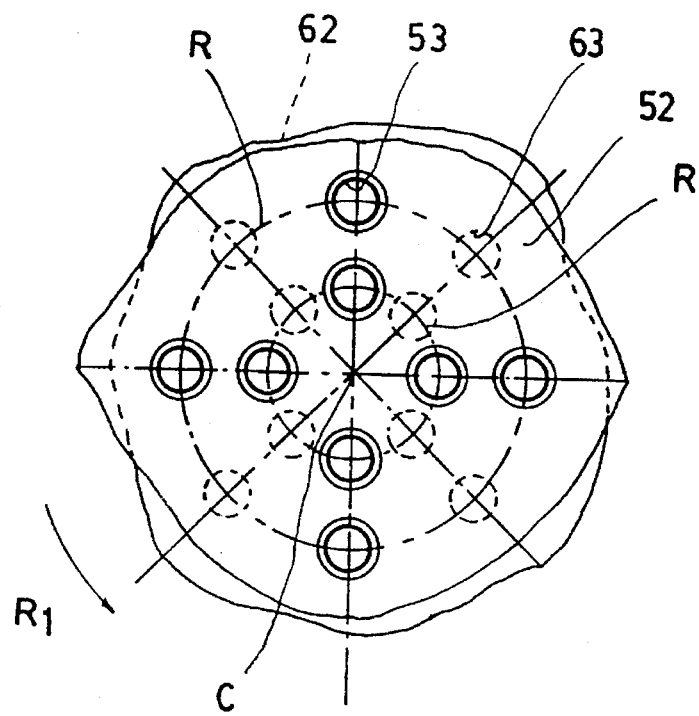
FIG. 4 is a top view illustration showing the closing of the extruding and forming means of the present invention.

The forming means 6 includes: a hopper 61 disposed around and positioned under the extruding means 5, and a hopper bottom plate 62 having a plurality of discharging holes 63 drilled through the hopper bottom plate 62 each discharge hole 63 operatively aligned and communicated with each injection hole 53 formed in the extruding means 5 for discharging the extruded carbon dioxide snow bar 7 through each discharge hole 63 (FIG. 5); and each discharge hole 63 normally disconnected with each injection hole 53 for closing the bottom holes of the extruding means 5 when feeding the raw material 10 into the cylinder 51 of the extruding means 5 before the extruding operation (FIG. 4).

Figure 5:
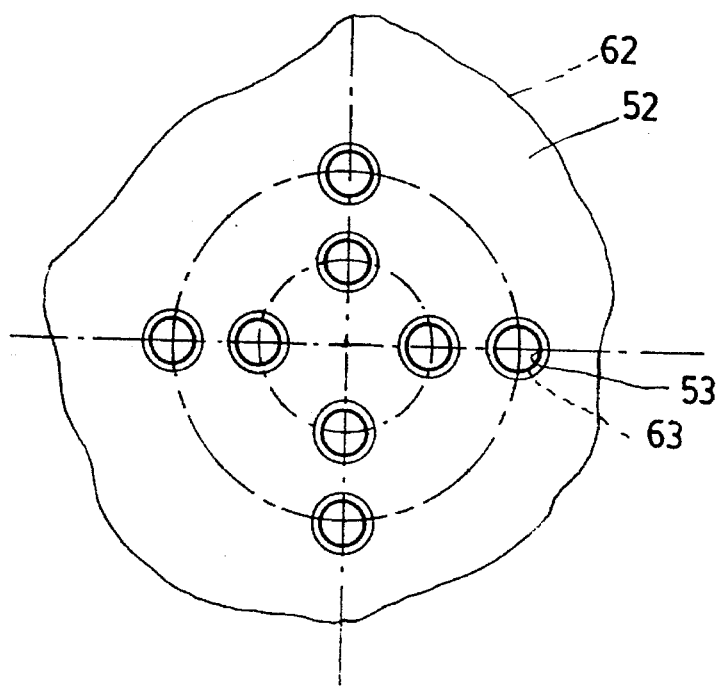
FIG. 5 shows an opened extruding and forming means in accordance with the present invention.

So, each discharge hole 63 in the forming means 6 is normally projectively separated from each injection hole 53 in the extruding means 5, with each discharge hole 63 and each injection hole 53 disposed concentrically along a same curvature R concentric to a same center C of the extending means 5 and the forming means 6 as shown in FIG. 4, and upon a rotation (R1) of the forming means 6 relative to the extruding means 5 from FIG. 4 to FIG. 5 to projectively align each discharge hole 63 with each injection hole 53, the snow bar 7 will be formed through the forming means 6.

The forming means 6 further includes a step-by-step motor 64 having a driving pulley 65, and a driving belt or chain 66 engageable with a perimeter of the hopper 61 of the forming means 6 and driven by the pulley 65, whereby upon a rotation of the motor 64 to rotate the forming means to projectively align each discharge hole 63 with each injection hole 53, the snow bar 7 may be formed by injecting the snow bar 7 through the injection hole 53 and the discharge hole 63.

The number of the injection holes 53 and the discharge holes 63 are not limited in the present invention.

Figure 10:
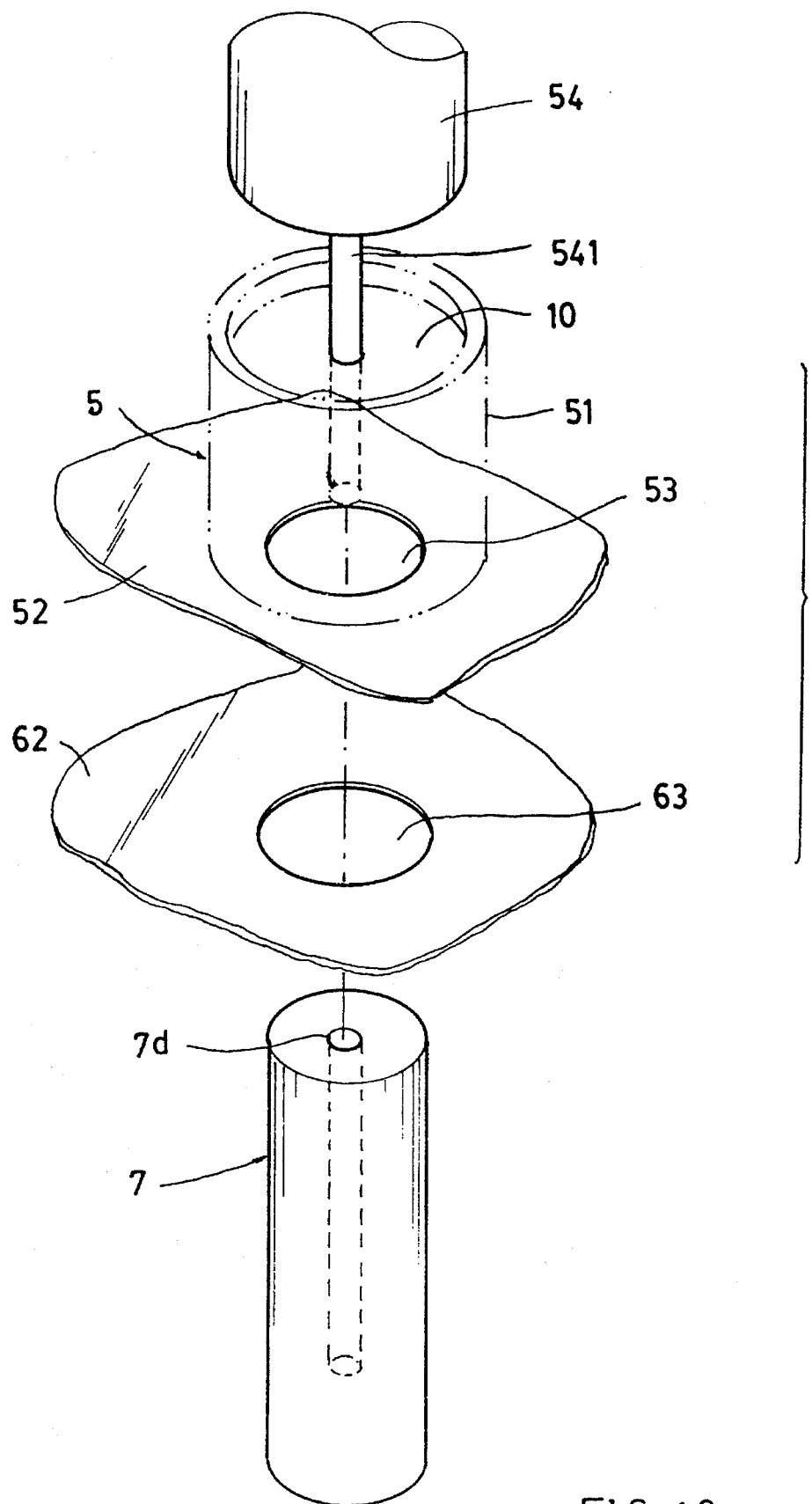
FIG. 10 shows another preferred apparatus for making a fifth snow bar in accordance with the present invention.

As shown in FIG. 10, the plunger 54 of the extruding means 5 may be modified to have a stem 541 protruding downwardly or outwardly from the plunger 54 to drill a central opening 7d deeply recessed in the snow bar 7 for filling juice concentrate or other favorite ingredient into the snow bar 7.

Figure 11:
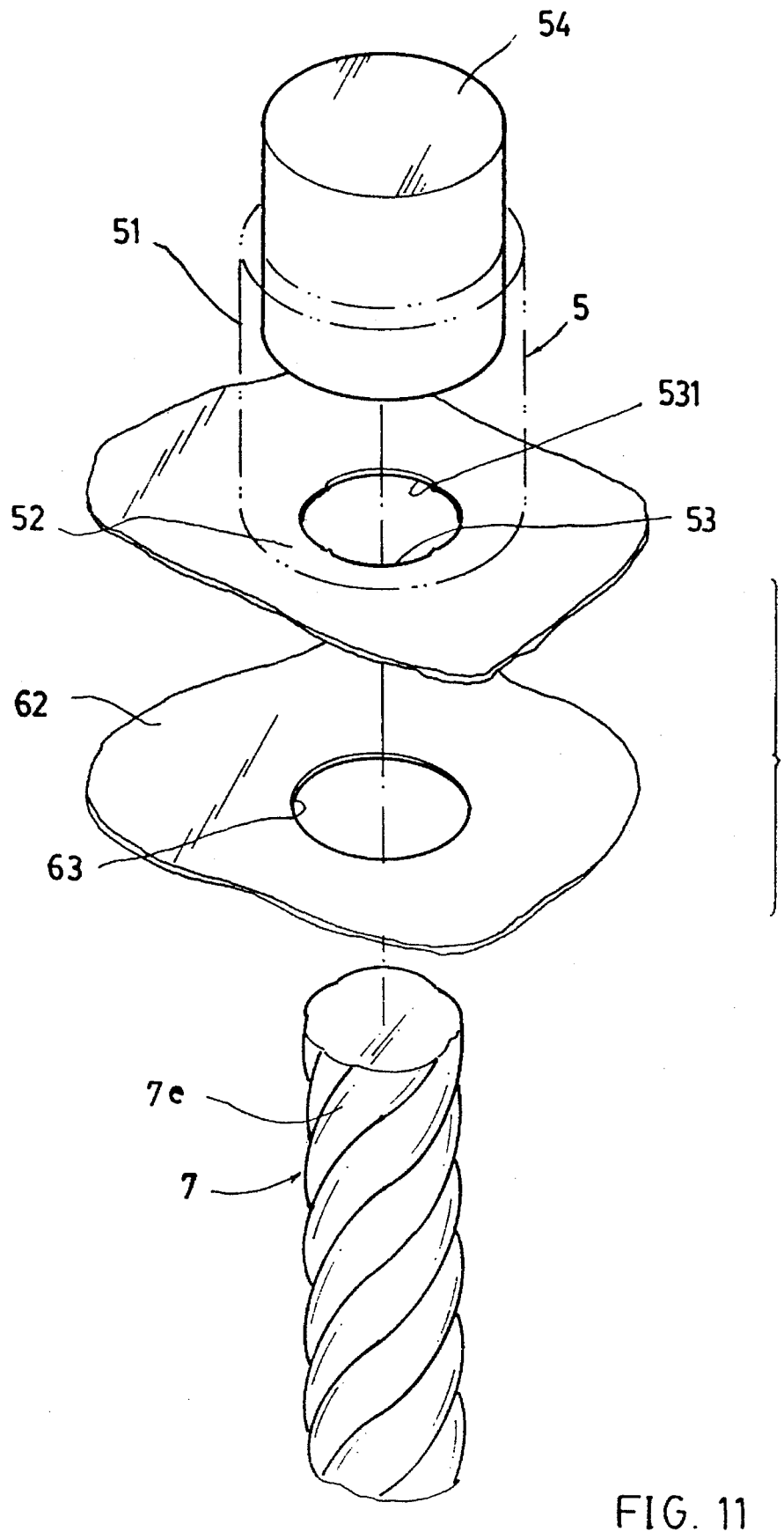
FIG. 11 shows still another preferred apparatus for making a sixth snow bar of the present invention.

As shown in FIG. 11, the extruding means 5 may be modified to have an injection hole 53 formed with a corrugated edge 531 along the perimeter of the injection hole 53, and a rotating means (not shown) provided for rotating the extruding means 5 for continuously forming a snow bar 7 having at least a spiral convex portion 7e on the snow bar 7 for decorative purpose.

The present invention is superior to the conventional fizzy drink made by dry ice because the diversified designs of snow or frost bar 7 which is made to be a small piece for easy eating or drinking can be obtained by the present invention. The present invention may satisfy the end users in multiple ways such as by taste, by smell and by visual art. The piece of $CO_2$ snow bar 7 may be dropped into a liquid to serve a bubbling, flavoring and colorful drink for interesting purpose.

The present invention may be modified without departing from the spirit and scope of the present invention.

Besides, other vaporizable liquid, or compressible gases may also be used to substitute the carbon dioxide as aforementioned. The liquid or gas should be nontoxic and should have no hazard to human health.

I claim:

1. An apparatus for making carbon-dioxide snow bar comprising:
    means for providing a liquefied carbon dioxide;
    means for providing at least an edible filler;
    an extruding means for receiving a raw material mixed by said carbon dioxide and said edible filler as delivered through a feeding means and controlled by a control means, said extruding means operatively extruding at least a streamflow containing said carbon dioxide and said filler;
    a forming means disposed around said extruding means for forming and shaping the streamflow from said extruding means for producing a snow bar as discharged from said forming means;
    a packaging means for packing said snow bar after being cut into a small piece of the snow bar; and
    a freezing storage means for storing the snow bar.

2. An apparatus according to claim 1, wherein said carbon dioxide is fed into said extruding means by said feeding means, having a carbon-dioxide solenoid valve provided in said feeding means and controlled by said control means for opening and closing said solenoid valve.

3. An apparatus according to claim 1, wherein said edible filler is fed into said extruding means by said feeding means, having a filler solenoid valve provided in said feeding means and controlled by said control means for opening and closing said solenoid valve.

4. An apparatus according to claim 1, wherein said feeding means includes: a plurality of branch tubes respectively communicated with the liquefied carbon dioxide and a plurality of edible fillers; and a feeder pipe for feeding the raw matter into the extruding means.

5. An apparatus according to claim 1, wherein said extruding means includes: a cylinder communicated with the feeding means, a plunger reciprocatively held in the cylinder for squeezing the raw material of the liquefied carbon dioxide and the edible filler as fed by the feeding means, and a cylinder bottom plate drilled with a plurality of injection holes through the cylinder bottom plate for outwardly injecting the raw material into said forming means.

6. An apparatus according to claim 5, wherein said forming means includes: a hopper disposed around and positioned under the extruding means, and a hopper bottom plate having a plurality of discharging holes drilled through the hopper bottom plate each said discharge hole operatively aligned and communicated with each said injection hole formed in the extruding means for discharging a carbon dioxide snow bar through each said discharge hole; and each said discharge hole normally disconnected from each said injection hole for closing the injection holes of the extruding means when feeding the raw material into the cylinder of the extruding means before the extrusion of said raw material.

7. An apparatus according to claim 6, wherein each said discharge hole in the forming means is normally projectively separated from each said injection hole in the extruding means, each said discharge hole and each said injection hole concentrically disposed on a same curvature concentric to a same center of said extruding means and said forming means, and upon a rotation of the forming means relative to the extruding means to projectively align each said discharge hole with each said injection hole, the snow bar will be discharged through the forming means.

8. An apparatus according to claim 7, wherein said forming means includes a step-by-step motor having a driving pulley, and a driving belt engageable with a perimeter of the hopper of the forming means and driven by the pulley, whereby upon a rotation of the motor to rotate said forming means to projectively align each said discharge hole with each said injection hole, the snow bar will be formed by injecting the snow bar through the injection hole and the discharge hole.

9. An apparatus according to claim 5, wherein said plunger of the extruding means includes a stem protruding outwardly from the plunger to drill a central opening recessed in the snow bar for filling an additive into the snow bar.

10. An apparatus according to claim 5, wherein said extruding means includes at least an injection hole having a corrugated edge formed along a perimeter of the injection hole, and a rotating means for rotating the extruding means for continuously forming at least a spirally shaped snow bar.

* * * * *